Figure 1:
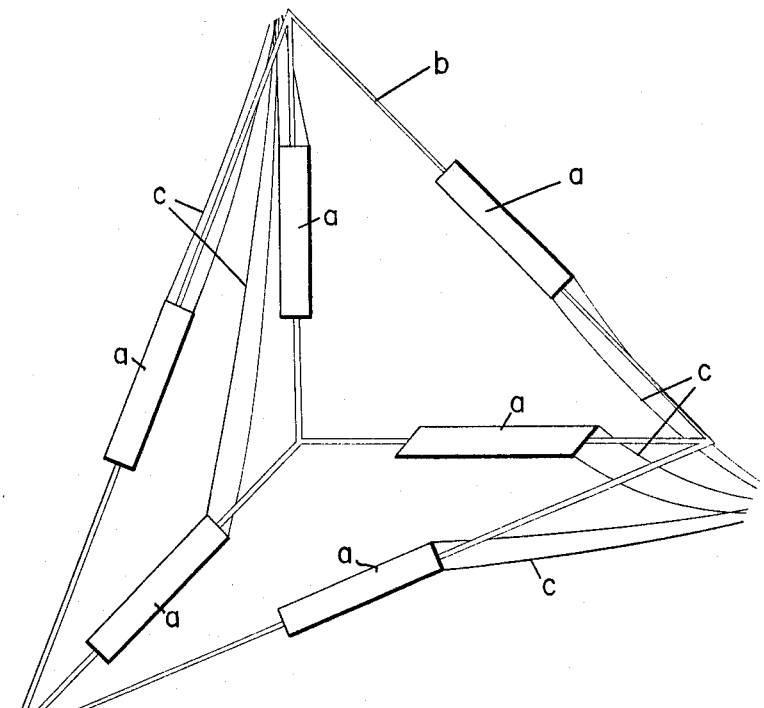

Nov. 22, 1966   Z. A. WASIUTYNSKI   3,286,513
CONCRETE PROBE
Filed Sept. 12, 1963

INVENTOR

ZBIGNIEW A. WASIUTYNSKI

BY *Larson and Taylor*

ATTORNEYS

United States Patent Office 3,286,513
Patented Nov. 22, 1966

1

3,286,513
CONCRETE PROBE
Zbigniew A. Wasiutynski, Warsaw, Poland, assignor to Polska Akademia Nauk-Instytut Podstawowych Problemow Techniki, Warsaw, Poland
Filed Sept. 12, 1963, Ser. No. 308,585
Claims priority, application Poland, Sept. 14, 1962, P 99,657
1 Claim. (Cl. 73—88.5)

This invention relates to a probe for use in measuring deformations of a concrete element. More particularly the invention relates to a concrete probe to be embedded in a concrete element for use in measuring the six strain components at a desired spot in the concrete element.

The object of the invention is to provide a concrete probe destined for measuring the six strain components at any spot of a concrete element.

Till now concrete deformations were measured for the most part separately for each strain component.

The concrete probe according to the invention provides the possibility of measuring simultaneously six components of concrete deformations.

Figure 2:
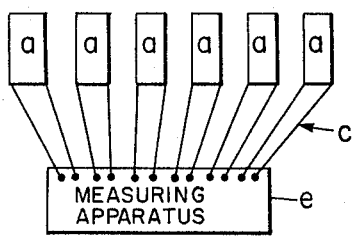

In the drawing:

FIGURE 1 is a schematic illustration of the preferred embodiment of the invention with the strain gauges and connecting wires attached; and FIGURE 2 is a schematic diagram showing the strain gauges connected in the usual manner to an indicating apparatus of a well known type.

The concrete probe has the form of an open frame constituting the bars of a tetrahedron as it is shown in FIG. 1.

The edges $b$ of the probe frame are made of any material, e.g., of sheet strips having convenient deformation properties. Resistance strain gauges $a$ are glued on each edge of said frame and constitute a three dimensional system of strain gauges permitting a simultaneous measuring of six deformation components, which fact finds its expression in the conformable simultaneous change of electric resistances of all the strain gauges.

Wires $c$ connect all the strain gauges $a$ with a central measuring apparatus $e$ indicating or registering each of the six strain components, as schematically illustrated in FIG. 2. The indicating or measuring apparatus is of course of the well known or customary type, and accordingly forms no part of the instant invention.

2

The whole skeleton of the probe together with the strain gauges glued thereon are embedded in the concrete the deformations of which are to be measured. The connecting wires of course lead out from the concrete for connection to the measuring or indicating device $e$. The strain gauges and the electric wires are insulated from concrete.

The probe of the instant invention supplies all necessary data as to conditions in the actual body itself, and accordingly permits the study of actual conditions in the real object, as opposed to the customary use of models and hypothetical relations. The six strain components which can be measured or indicated through the use of the tetrahedron probe provide the basis for a complete understanding and analysis of actual conditions in the actual body in the area of the probe. Such analyses of course form no part of the instant invention itself, which involves the concept and structure of the probe itself, and in any event the analyses are well within the skill of the art from well known texts on strength and properties of materials, an example being "Theory of Elasticity" by Timoshenko and Gordier (McGraw-Hill 1951).

What I claim is:

A concrete probe adapted to be embedded in concrete for use in simultaneously measuring six strain components at a selected spot in the concrete, comprising: a plurality of elongate members connected together to form the edges of an open framework in the form of a tetrahedron, with predetermined angles between connected members, at least one strain gauge connected to each member for use in measuring the deformation thereof, and individually identifiable conductors leading from the respective gauges for connection to a measuring apparatus.

References Cited by the Examiner
FOREIGN PATENTS
957,980  2/1957  Germany.

OTHER REFERENCES

General Electric Review, article entitled "Orientation of Strain Gages in Stress Analysis," by A. W. Rankin, September 1947, pages 14–20.

RICHARD C. QUEISSER, Primary Examiner.

J. C. GOLDSTEIN, Assistant Examiner.